(12) United States Patent
Riva et al.

(10) Patent No.: US 10,447,138 B2
(45) Date of Patent: Oct. 15, 2019

(54) CONVERTER CONFIGURED TO CONVERT A DC INPUT VOLTAGE TO A DC OUTPUT VOLTAGE AND INCLUDING AT LEAST ONE RESISTIVE ELEMENT

(71) Applicant: STMicroelectronics S.r.l., Agrate Brianza (IT)

(72) Inventors: Alberto Riva, Giussano (IT); Giorgio Oddone, Villeneuve (IT)

(73) Assignee: STMICROELECTRONICS S.R.L., Agrate Brianza (MB) (IT)

( * ) Notice: Subject to any disclaimer, the term of this patent is extended or adjusted under 35 U.S.C. 154(b) by 0 days.

(21) Appl. No.: 15/471,739

(22) Filed: Mar. 28, 2017

(65) Prior Publication Data
US 2018/0287493 A1    Oct. 4, 2018

(51) Int. Cl.
*H02M 3/158* (2006.01)
*H02M 1/08* (2006.01)
*H02M 1/00* (2006.01)
*H02M 7/00* (2006.01)
*H02M 3/156* (2006.01)

(52) U.S. Cl.
CPC ........... *H02M 1/08* (2013.01); *H02M 3/1588* (2013.01); *H02M 3/156* (2013.01); *H02M 7/003* (2013.01); *H02M 2001/0054* (2013.01); *Y02B 70/1466* (2013.01); *Y02B 70/1491* (2013.01)

(58) Field of Classification Search
CPC ....... H02M 3/156; H02M 3/158; H02M 7/003
See application file for complete search history.

(56) References Cited

U.S. PATENT DOCUMENTS

| | | | |
|---|---|---|---|
| 8,406,024 B2* | 3/2013 | Nakamura | H02M 7/537 363/131 |
| 9,602,096 B2 | 3/2017 | Botti | |
| 2013/0049137 A1* | 2/2013 | Uno | H01L 27/088 257/401 |
| 2015/0035580 A1* | 2/2015 | Botti | H01L 21/82387 327/374 |

\* cited by examiner

*Primary Examiner* — Fred E Finch, III
*Assistant Examiner* — Rafael O. De León Domenech
(74) *Attorney, Agent, or Firm* — Slater Matsil, LLP (57) ABSTRACT

A converter configured to convert a DC input voltage to a DC output voltage, may include: a high-side driver circuit having a first terminal coupled to a first die pad; a high-side transistor having a drain terminal coupled to a second die pad and a source terminal coupled to a third die pad; and a low-side transistor having a source terminal coupled to a fourth die pad and a drain terminal coupled to a fifth die pad. The converter may further include a resistive element coupled between the source terminal of the high-side transistor and the drain terminal of the low-side transistor, where a second terminal of the high-side driver circuit is coupled to a sixth die pad.

18 Claims, 5 Drawing Sheets

FIG. 5B

CONVERTER CONFIGURED TO CONVERT A DC INPUT VOLTAGE TO A DC OUTPUT VOLTAGE AND INCLUDING AT LEAST ONE RESISTIVE ELEMENT

TECHNICAL FIELD

The present disclosure relates generally to DC-DC converters, and, in particular embodiments, to a converter including at least one resistive element.

BACKGROUND

Direct-current voltage converters, also known as DC-DC converters, are widely used for converting an input voltage to an output voltage. DC-DC converters are available in various topologies, including buck converters (e.g. step-down converters), boost converters (e.g. step-up converters) and buck-boost converters (e.g. step-down step-up converters), as well as other topologies.

DC-DC converters are used to supply electronic circuitry with a particular voltage, usually obtained from converting the input voltage coming from a battery to an output voltage having a particular value. A requirement for DC-DC converters is therefore to have a high conversion efficiency (e.g. power efficiency) to save battery energy. Such high conversion efficiency in a DC-DC converter may be achieved by having at least one of low DC-DC switch resistances, low parasitic resistances, low parasitic capacitances, low parasitic inductances, or short switching times. As such, it may be desirable to provide DC-DC converters having short switching times so as to achieve high conversion efficiencies in DC-DC converters.

SUMMARY

In an embodiment, a converter configured to convert a DC input voltage to a DC output voltage, may include: a high-side driver circuit having a first terminal coupled to a first die pad; a high-side transistor having a drain terminal coupled to a second die pad and a source terminal coupled to a third die pad; and a low-side transistor having a source terminal coupled to a fourth die pad and a drain terminal coupled to a fifth die pad. The converter may further include a resistive element coupled between the source terminal of the high-side transistor and the drain terminal of the low-side transistor, where a second terminal of the high-side driver circuit is coupled to a sixth die pad.

In an embodiment, a converter configured to convert a DC input voltage to a DC output voltage, may include: a high-side switching transistor coupled between a voltage input node and a high-side switching node; a low-side switching transistor coupled between a low-side switching node and a ground node; and a first resistive element coupled between the high-side switching node and the low-side switching node. The converter may further include a high-side driver having a first terminal coupled to a boot node and a second terminal coupled to an auxiliary switching node different from the low-side switching node and the high-side switching node, the high-side driver being configured to control an operation of the high-side switching transistor.

In an embodiment, a converter configured to convert a DC input voltage to a DC output voltage, may include: a high-side transistor having a drain terminal and a source terminal respectively coupled to a voltage input pin and a switching pin of a package by a first pair of bonding wires; and a high-side driver having a first terminal and a second terminal respectively coupled to a boot pin and the switching pin of the package by a second pair of bonding wires different from the first pair of bonding wires. The high-side driver may be configured to output a high-side drive signal to a gate terminal of the high-side transistor. The converter may further include a low-side transistor having a drain terminal and a source terminal respectively coupled to the switching pin and a ground pin of the package by a third pair of bonding wires different from the second pair of bonding wires; and a first resistive element coupled between the source terminal of the high-side transistor and the drain terminal of the low-side transistor.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

Voltage regulation is commonly required to prevent variations in the supply voltage powering various microelectronic components such as digital integrated circuits (ICs), semiconductor memories, display modules, hard disk drives, radio-frequency (RF) circuitry, microprocessors, digital signal processors and analog ICs, especially in battery powered application such as cell phones, notebook computers and consumer products.

Since the battery or direct current (DC) input voltage of a product often must be stepped-up to a higher DC voltage, or stepped-down to a lower DC voltage, such regulators are referred to as DC-DC converters. Step-down converters, commonly referred to as Buck converters, are used whenever a battery's voltage is greater than the desired load voltage. Step-down converters may include inductive switching regulators, capacitive charge pumps, and linear regulators. Conversely, step-up converters, commonly referred to boost converters, are needed whenever a battery's voltage is lower than the voltage needed to power the load. Step-up converters may include inductive switching regulators or capacitive charge pumps.

A DC-DC converter may be implemented as a die, and the die implementing the DC-DC converter may be disposed within a package (e.g. a chip package). Die pads and package pins may be coupled to each other by bonding wires, which may, unfortunately, act as parasitic inductors. However, a current in an inductor (e.g. the bonding wires that act as parasitic inductors) may not be changed instantly and the inductor may produce an opposing voltage that resists a change in its current. This may adversely affect the transition time of the switching node, thus increasing the dissipated power. Hence the maximum switching frequency of a DC-DC converter is also affected due to power dissipation issues. In particular, the package must be able to dissipate the power that is internally produced while keeping die temperature under a thermal shutdown threshold. The increment of the switching frequency (e.g. reduction of pulse-width modulation (PWM) cycle duration) increases the internally produced switching power (e.g. since same switching energy must be dissipated in less time) and this may increase die temperature. For this reason, it is important to have short turn on and turn off times to minimize the required switching energy to perform each single PWM cycle (e.g. turn on and turn off of both a high side transistor and a low side transistor) and hence allow the device to work with high switching frequencies (frequency at which the PWM signal is repeated) with high efficiency and without triggering thermal shutdown protection.

One way to circumvent the above-described adverse effect on the switching frequency of a DC-DC converter may be to use a package without bonding wires in an attempt to avoid parasitic inductances caused by the bonding wires. However, such packages are expensive to manufacture and are generally avoided in some technologies (e.g. in the automotive industry) due to increased complexity of quality control (e.g. since such packages may need to be visually inspected at the production line to ensure proper soldering of package pins). As such, it may be desirable to provide a DC-DC converter capable of delivering high currents at high switching frequencies with high conversion efficiency, low internal noise, and reduced electromagnetic interference, even when such a DC-DC converter is included in a package where die pads and package pins are coupled to each other by bonding wires.

Figure 1:
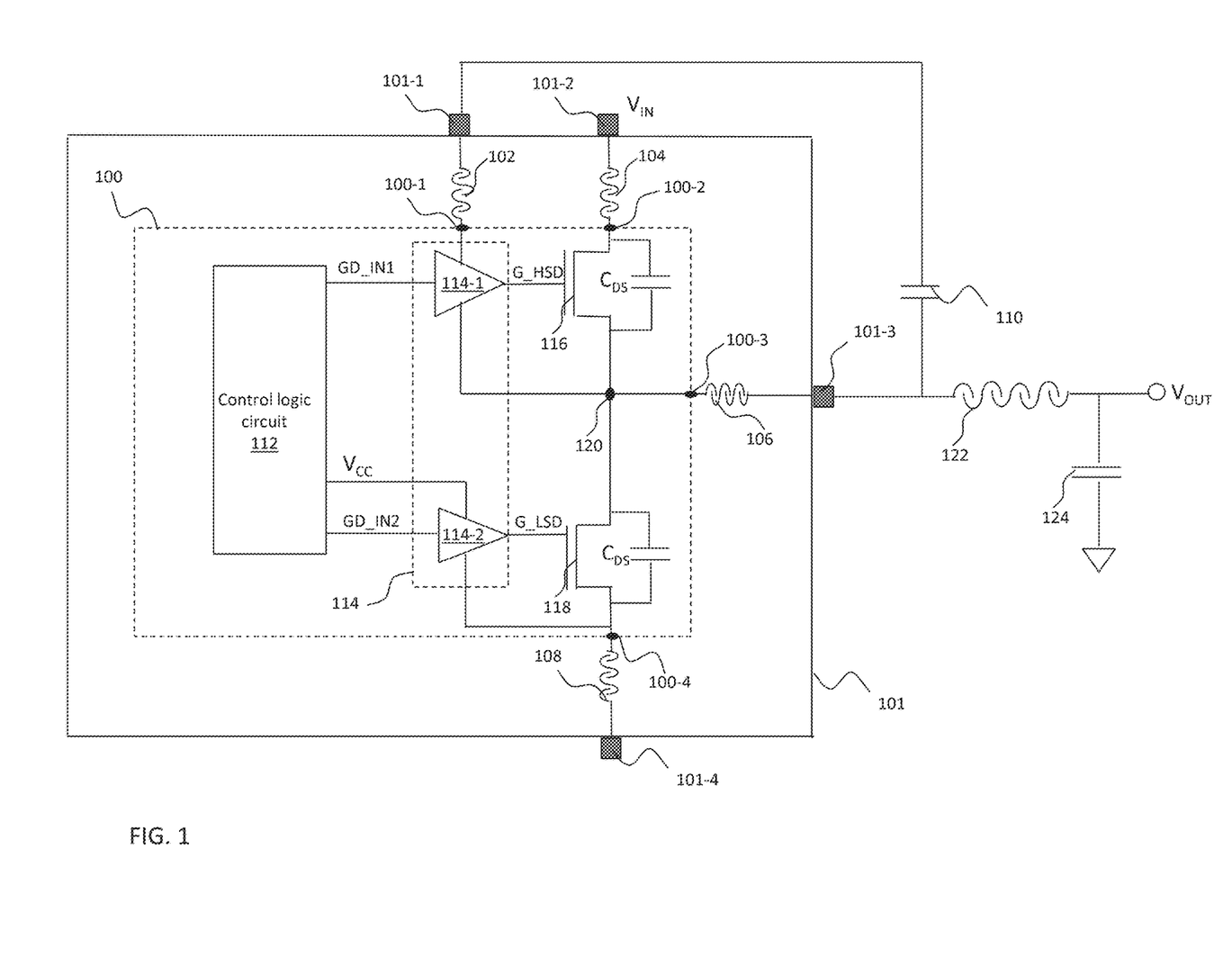
FIG. 1 shows a circuit diagram illustrating a first DC-DC converter within a package, in which a source terminal of a high-side transistor and a drain terminal of a low-side transistor form a switching node.

FIG. 1 shows circuit diagram illustrating a first DC-DC converter 100 (e.g. a buck converter) within a package 101. The combination of the first DC-DC converter 100 and the package 101 may be referred to as a switching converter configured to convert a DC input voltage to a DC output voltage. The first DC-DC converter 100 may be a die including a first die pad 100-1 (e.g. a boot node), a second die pad 100-2 (e.g. an input voltage node), a third die pad 100-3 (e.g. a switching node), and a fourth die pad 100-4 (e.g. a ground node). The first die pad 100-1 may be coupled to a boot pin 101-1 of the package 101 through at least one bonding wire, which acts as a first parasitic inductor 102 coupled between the first die pad 100-1 and the boot pin 101-1. Similarly, the second die pad 100-2 may be coupled to an input voltage pin 101-2 of the package 101 through at least one bonding wire, which acts as a second parasitic inductor 104 coupled between the second die pad 100-2 and the input voltage pin 101-2. The input voltage pin 101-2 may be configured to receive an input voltage $V_{IN}$ (e.g. measured relative to a ground potential), which the first DC-DC converter 100 converts to an output voltage $V_{OUT}$. The third die pad 100-3 may be coupled to a switching pin 101-3 of the package 101 through at least one bonding wire, which acts as a third parasitic inductor 106 coupled between the third die pad 100-3 and the switching pin 101-3. In like manner, the fourth die pad 100-4 may be coupled to a ground pin 101-4 of the package 101 through at least one bonding wire, which acts as a fourth parasitic inductor 108 coupled between the fourth die pad 100-4 and the ground pin 101-4. The example shown in FIG. 1 also includes a boot capacitor 110 that is external to the package 101. The boot capacitor 110 may have a first terminal coupled to (e.g. to form a node with) the switching pin 101-3 and a second terminal coupled to (e.g. to form a node with) the boot pin 101-1.

In the description that follows, the internal circuitry of the first DC-DC converter 100 is discussed. The couplings and connections of the internal circuitry of the first DC-DC converter 100 may be accomplished using conductive lines formed in a dielectric layer of a semiconductor die implementing the first DC-DC converter 100. The first DC-DC converter 100 includes a control logic circuit 112 configured to generate a first control signal $GD\_IN_1$ and a second control signal $GD\_IN_2$, which may be pulse width modulated (PWM) signals, for example. The first control signal $GD\_IN_1$ and the second control signal $GD\_IN_2$ are provided as inputs to a gate driver circuit 114, which is also included in the first DC-DC converter 100. The gate driver circuit 114 includes a high-side driver 114-1 and a low-side driver 114-2. A power terminal of the high-side driver 114-1 is coupled to (e.g. to form a node with) the first die pad 100-1. The high-side driver 114-1 uses the boot capacitor no as a power source for driving a high-side transistor 116 (e.g. a high-side switching transistor). The high-side driver 114-1 outputs a high-side drive signal G_HSD to a gate terminal of the high-side transistor 116, thereby controlling the operation of the high-side transistor 116. The low-side driver 114-2 outputs a low-side drive signal G_LSD to a gate terminal of a low-side transistor 118, thereby controlling the operation of the low-side transistor 118 (e.g. low-side switching transistor). In some cases, such as in the example of FIG. 1, a power terminal of the low-side driver 114-2 receives an internal voltage $V_{CC}$, lower than the input voltage $V_{IN}$, as a power source for driving the low-side transistor 118. In the example of FIG. 1, the internal voltage $V_{CC}$ is provided to the power terminal of the low-side driver 114-2 by the control logic circuit 112.

As shown in FIG. 1, a drain terminal of the high-side transistor 116 is coupled to (e.g. to form a node with) the second die pad 100-2, while a source terminal of the high-side transistor 116 is coupled to (e.g. to form a node with) a drain terminal of the low-side transistor 118. The drain terminal of the low-side transistor 118 and the source terminal of the high-side transistor 116 form a switching node 120, which may, itself, form a node with the third die pad 100-3. As shown in FIG. 1, a source terminal of the low-side transistor 118 is coupled to (e.g. to form a node with) the fourth die pad 100-4. A reference terminal of the high-side driver 114-1 may be coupled to (e.g. to form a node with) the switching node SW, while a reference terminal of the low-side driver 114-2 may be coupled to (e.g. to form a node with) the source terminal of the low-side transistor 118 and the fourth die pad 100-4.

In the circuit diagram shown in FIG. 1, the third die pad 100-3 is coupled (e.g. to form a node with) a first terminal of an output inductive element 122, while a second terminal of the output inductive element 122 is coupled to the output voltage $V_{OUT}$. The circuit shown in FIG. 1 also includes an output capacitive element 124 coupled between the output voltage $V_{OUT}$ and a reference potential (e.g. a ground potential).

The high-side transistor 116 includes a high-side parasitic capacitor (e.g. drain-to-source parasitic capacitor $C_{DS}$) coupled between the drain and source terminals of the high-side transistor 116. In like manner, the low-side transistor 118 includes a low-side parasitic capacitor (e.g. drain-to-source parasitic capacitor $C_{DS}$) coupled between the drain and source terminals of the low-side transistor 118. Further parasitic capacitances (e.g. between gate and source terminals and between gate and drain terminals) of the high-side transistor 116 and the low-side transistor 118 may also be present, but these are omitted from the circuit diagram shown in FIG. 1 for the sake of simplicity and clarity.

One requirement for DC-DC converters, such as the first DC-DC converter 100 in FIG. 1, is to have high conversion efficiency (e.g. high power conversion efficiency). Such high conversion efficiency in a DC-DC converter may be achieved by having at least one of low DC-DC switch resistances, low parasitic resistances, low parasitic capacitances, low parasitic inductances, or short switching times. However, when a technology node is fixed and when the dimensions of the first DC-DC converter 100 and the package 101 are fixed, then the parasitic resistances, parasitic capacitances, and parasitic inductances may also be fixed. Therefore, in order to increase the conversion efficiency of the first DC-DC converter 100, there may be a need to decrease the switching time of the first DC-DC converter 100. In other words, the time needed for the high-side transistor 116 and the low-side transistor 118 to turn on and off may need to be reduced in order to increase the conversion efficiency of the first DC-DC converter 100.

In general, when the high-side transistor 116 is turned on, a high transient current flows into the low-side transistor 118, thereby creating noise mainly in the parasitic inductors 104 and 108 and secondarily in parasitic inductor 102. Furthermore, the parasitic inductors 102, 104, 108 may produce an opposing voltage that resists a change in its current, thereby adversely affect the switching frequency of the first DC-DC converter 100. To limit the transient current flowing through the parasitic inductors 102, 104, 108, the gate terminal of the high-side transistor 116 may be charged slowly, thus increasing the time needed for the high-side transistor 116 to turn on. This, in turn, increases a dead time of the low-side transistor 118, which leads to a further increase in a reverse recovery charge ($Q_{RR}$) needed to turn off a body diode of the low-side transistor 118. Additionally, as the time needed for the high-side transistor 116 to turn on is increased (e.g. due to slow charging of its gate terminal), switching dissipation losses are increased also due to voltage and current crossings.

One way of circumventing the increase in the reverse recovery charge $Q_{RR}$ and the dead time of the low-side transistor 118 is to increase the speed at which the high-side transistor 116 is turned on, which may be accomplished by increasing the peak current needed to charge the parasitic capacitances $C_{DS}$ of the high-side transistor 116 and the low-side transistor 118, increasing in this way also the time derivative of the current flowing through the high-side transistor 116 and the low-side transistor 118. For example, the peak current flowing from the input voltage pin 101-2 to the ground pin 101-4 may be increased so as to charge more quickly the capacitors seen from the drain terminal of the low-side transistor 118. However, as seen in the circuit diagram of FIG. 1, current flowing from the input voltage pin 101-2 to the ground pin 101-4 would necessarily flow through the second parasitic inductor 104 and the fourth parasitic inductor 108. Additionally, the circuit path between the input voltage pin 101-2 and the ground pin 101-4 also includes at least the parasitic capacitors $C_{DS}$ of the high-side transistor 116 and the low-side transistor 118. In other words, LC circuits may be present in various paths between the input voltage pin 101-2 and the ground pin 101-4. As a result of this, increasing the peak current flowing between the input voltage pin 101-2 and the ground pin 101-4 has the drawback of causing voltage spikes and oscillations at nodes coupled to the high-side transistor 116, the low-side transistor 118, the high-side driver 114-1, and the low-side driver 114-2. The nodes affected by such voltage spikes and oscillations may include the switching node 120, the second die pad 100-2, the third die pad 100-3, and the fourth die pad 100-4. In view of the above-described drawbacks of the circuit diagram shown in FIG. 1, it may be desirable to reduce the effects of the voltage spikes and oscillations by using a particular circuit topology that is suitable to turn on very quickly the high-side transistor to reduce QRR and dead time (gate-source voltage of the high side transistor reaches quickly the threshold value) but can also decrease the time increment and the peak value of the current flowing in parasitic inductors 104 and 108. In this way it is possible to increase the conversion efficiency of a DC-DC converter, even such a DC-DC converter is included in the package 101 where die pads and package pins are coupled to each other by bonding wires.

Figure 2:
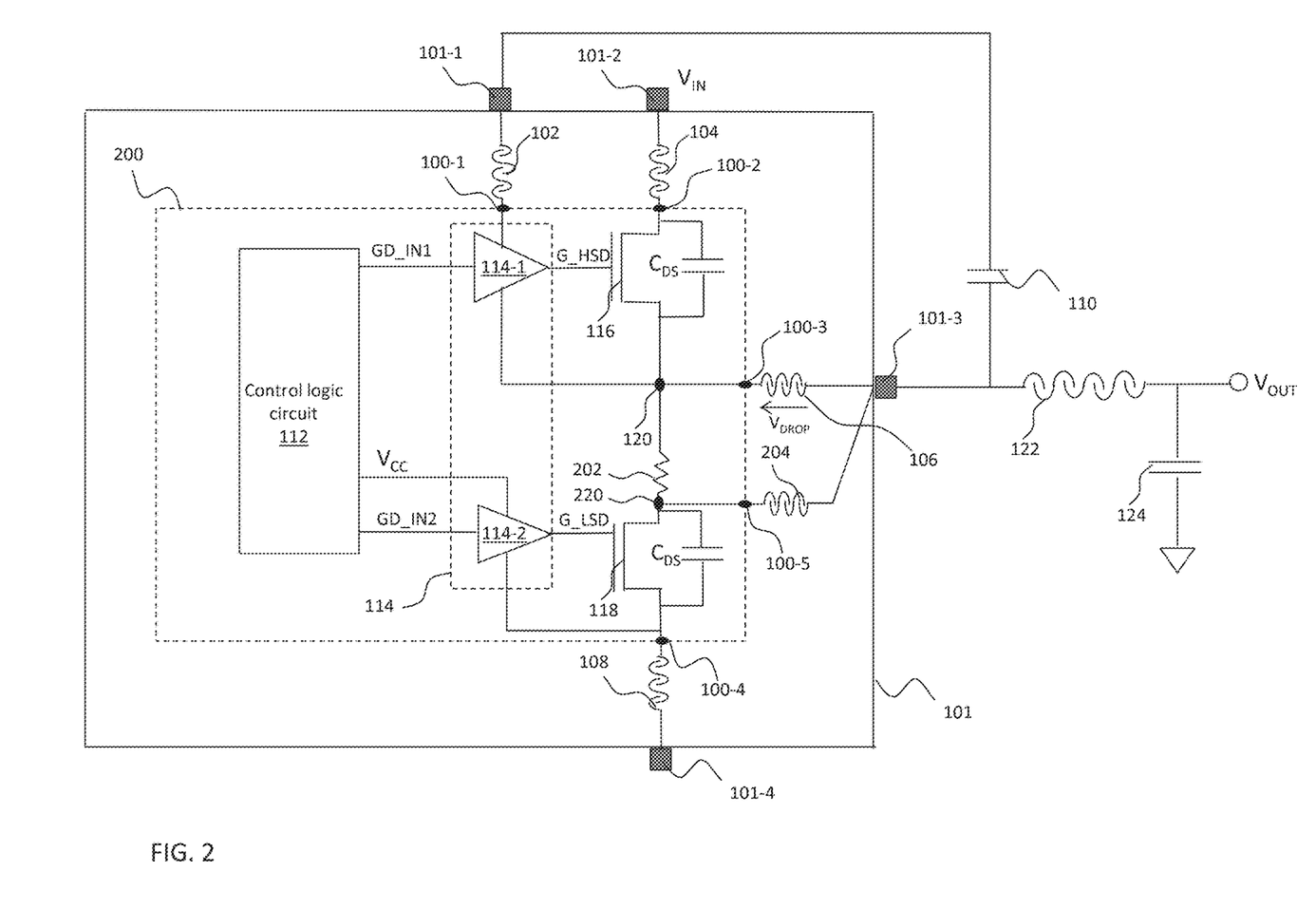
FIG. 2 shows a circuit diagram illustrating a second DC-DC converter within a package, in which a source terminal of a high-side transistor and a drain terminal of a low-side transistor are coupled through a resistive element, in accordance with an embodiment.

FIG. 2 shows a circuit diagram illustrating a second DC-DC converter 200 within the package 101, in which the source terminal of the high-side transistor 116 and the drain terminal of the low-side transistor 118 are coupled through a resistive element 202, in accordance with an embodiment. In other words, the switching node 120 is coupled (e.g. to form a node with) a first terminal of the resistive element 202, while a second terminal of the resistive element 202 may be coupled (e.g. to form a node with) the drain terminal of the low-side transistor 118. In some embodiments, the switching node 120 may be referred to as a high-side switching node 120 and the node formed by the second terminal of the resistive element 202 and the drain terminal of the low-side transistor 118 may be referred to as a low-side switching node 220. In the circuit diagram of FIG. 2, the reference terminal of the high-side driver 114-1 remains coupled to (e.g. to form a node with) the high-side switching node 120. In the circuit diagram shown in FIG. 2, the resistive element 202 is within the die implementing the second DC-DC converter 200 and may be implemented using one or more IC implementations know in the art. The second DC-DC converter 200 may include a fifth die pad 100-5 coupled to (e.g. to form a node with) the low-side switching node 220. As shown in FIG. 2, the fifth die pad 100-5 is coupled to the switching pin 101-3 of the package 101 through at least one bonding wire, which acts as a fifth parasitic inductor 204 coupled between the fifth die pad 100-5 and the switching pin 101-3.

The resistive element 202 is configured to dampen the voltage oscillations that arise at the input voltage pin 101-2 (due to other external parasitic inductors such as input capacitor ESL), the second die pad 100-2, the fourth die pad 100-4, the high-side switching node 120, and the low-side switching node 220. The resistive element 202 further limits the current flowing from the input voltage pin 101-2 to the ground pin 101-4 and, consequently, the current flowing to the low-side transistor 118 and through the second parasitic inductor 104, the fourth parasitic inductor 108. Due to this reduction or limiting in the current flowing from the input voltage pin 101-2 to the ground pin 101-4, the circuit topology shown in FIG. 2 permits to reduce the dead time of the low-side transistor 118 and the reverse recovery charge $Q_{RR}$ needed to turn off the body diode of the low-side transistor 118, increasing the speed of the first stage of the turn on of the high-side transistor 116 (when the gate source voltage of 116 goes from zero to its threshold value) and reducing the time increment and the peak value of the current flowing from the input voltage pin 101-2 to switching and ground pins respectively 101-3 and 101-4 (when the current starts to increase too quickly, voltage drop on inductor 106 prevent that gate source voltage of transistor 116 increases further). These desirable effects also lead to the second DC-DC converter 200 being capable of delivering high currents at high switching frequencies with high conversion efficiency, low internal noise, and reduced electromagnetic interference (e.g. compared to the first DC-DC converter 100), without the use of special packages that are devoid of bonding wires between package pins and die pads.

Despite the improvements provided by the circuit diagram shown in FIG. 2, there may still be some drawbacks associated with its topology. For example, in the circuit diagram shown in FIG. 2, a boot voltage at the boot pin 101-1 of the package 101 is fixed by the boot capacitor no connected between the boot pin 101-1 and the switching pin 101-3 of the package 101. The voltage drop, sustained by external capacitor no, between the boot pin 101-1 and switching pin 101-3, may be different from the voltage drop between first die pad 100-1 and the voltage at the high-side switching node 120 mainly due to voltage drop that arises on parasitic inductor 100-3, especially at the time when the high-side transistor 116 is turned on. In other words, the reference terminal of the high-side driver 114-1 may be at a voltage that is different from the switching pin 101-3 of the package 101 especially when high side transistor 116 is turned on. For example, at the time the high-side transistor 116 is turned on, a transient switching current flowing in the third parasitic inductor 106 increases a voltage $V_{DROP}$ across the third parasitic inductor 106, and this increase in voltage $V_{DROP}$ across the third parasitic inductor 106 is experienced by the high-side driver 114-1. As an illustration, due to the increase in the voltage $V_{DROP}$ across the third parasitic inductor 106 especially when the high-side transistor 116 is turned on, the voltage at the reference terminal of the high-side driver 114-1 is increased respect the voltage on switching pin 101-3, and this decreases the supply voltage seen by the high side driver measured from first die pad 100-1 to switching node 120. In addition every oscillation that arises on parasitic inductor 106 is directly transferred on the supply voltage of the high side driver that is the voltage drop between first die pad 100-1 and the switching node 120. Such voltage oscillations may limit the speed at which the high-side transistor 116 may be turned on even though the desirable effects of high conversion efficiency, low internal noise, and reduced electromagnetic interference (e.g. compared to the first DC-DC converter 100) are achieved.

Figure 3:
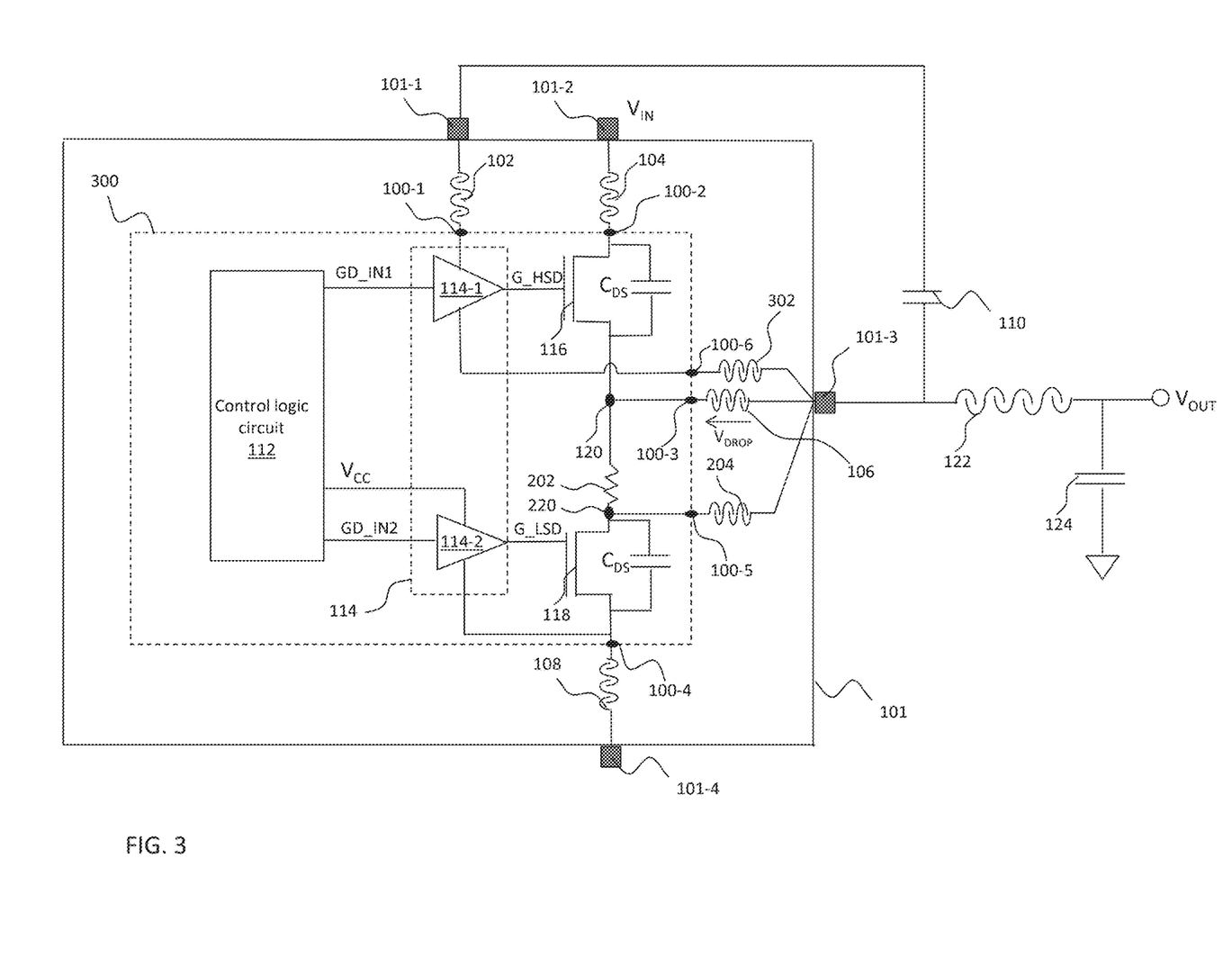
FIG. 3 shows a circuit diagram illustrating a third DC-DC converter within a package, in which a source terminal of a high-side transistor and a drain terminal of a low-side transistor are coupled through a resistive element and where a reference terminal of a high-side driver is decoupled from a high-side switching node, in accordance with an embodiment.

FIG. 3 shows a circuit diagram illustrating a third DC-DC converter 300 within the package 101, in which the source terminal of the high-side transistor 116 and the drain terminal of the low-side transistor 118 are coupled through the resistive element 202 and where the reference terminal of the high-side driver 114-1 is decoupled from the high-side switching node 120, in accordance with an embodiment. As shown in the circuit diagram of FIG. 3, the reference terminal (e.g. low reference terminal) of the high-side driver 114-1 may be coupled to (e.g. to form a node with) a sixth die pad 100-6 (e.g. switching node different from the high-side switching node 120 and the low-side switching node 220). As such, the reference terminal of the high-side driver 114-1 in FIG. 3 does not form a node with the high-side switching node 120 and the source terminal of the high-side transistor 116. As shown in FIG. 3, the sixth die pad 100-6 is coupled to the switching pin 101-3 of the package 101 through at least one bonding wire, which acts as a sixth parasitic inductor 302 coupled between the sixth die pad 100-6 and the switching pin 101-3. As a result of the circuit topology shown in FIG. 3, the voltage $V_{DROP}$ that occurs across the third parasitic inductor 106 when the high-side transistor 116 is turned on does not affect the voltage at the reference terminal of the high-side driver 114-1 (e.g. since the reference terminal of the high-side driver 114-1 is decoupled from the high-side switching node 120). It therefore follows that since the voltage $V_{DROP}$ across the third parasitic inductor 106 is not experienced by the reference terminal of the high-side driver 114-1, voltage oscillations at the reference terminal of the high-side driver 114-1 are reduced, thereby further increasing the speed at which the high-side transistor 116 may be turned on (e.g. compared to the second DC-DC converter 200 in FIG. 2).

Figure 4:
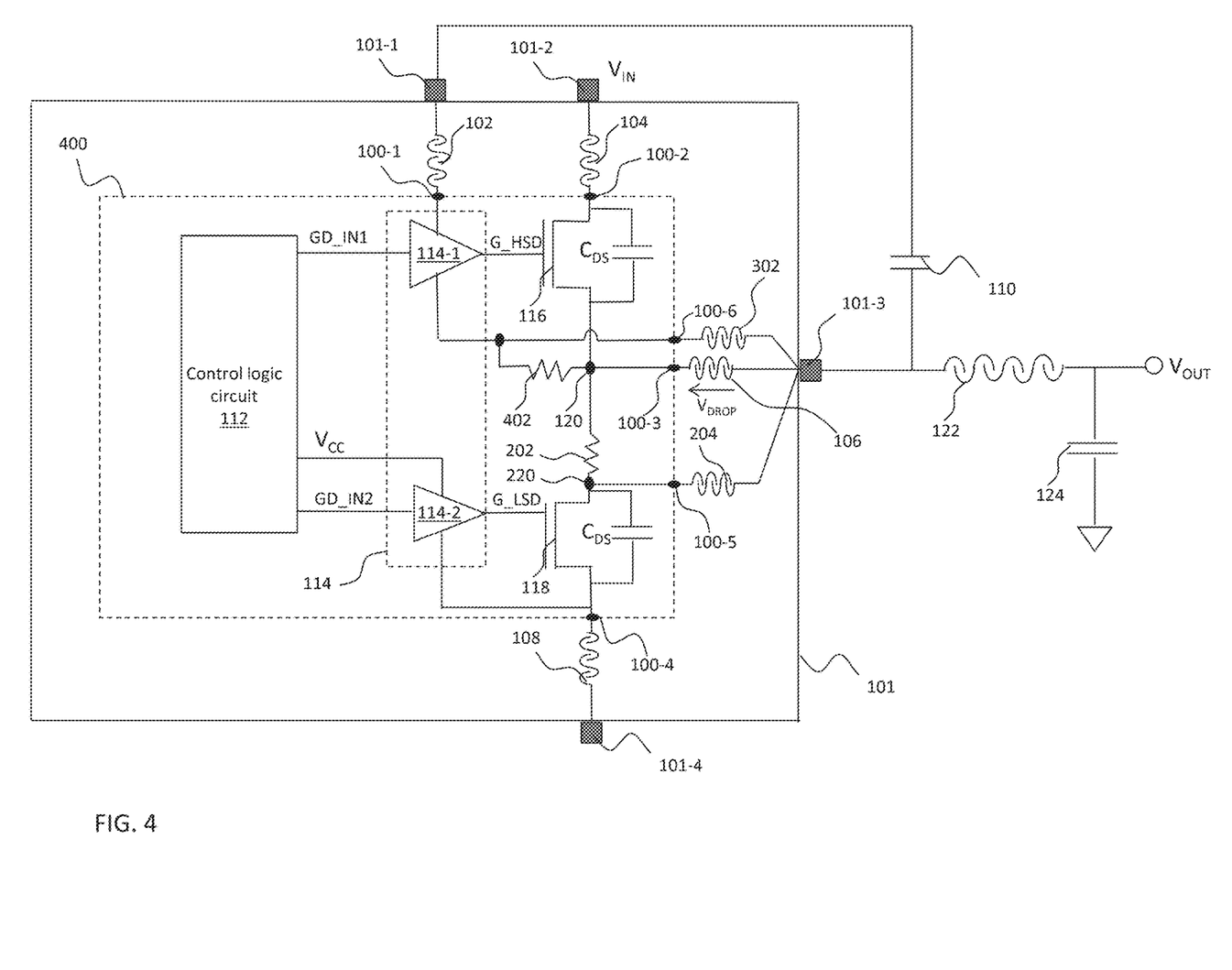
FIG. 4 shows a circuit diagram illustrating a fourth DC-DC converter within a package, in which a reference terminal of a high-side driver is coupled to form a node with die pad of the fourth DC-DC converter and additionally coupled to a high-side switching node through a second resistive element, in accordance with an embodiment.

FIG. 4 shows a circuit diagram illustrating a fourth DC-DC converter 400 within the package 101, in which the reference terminal of the high-side driver 114-1 is coupled to form a node with the sixth die pad 100-6 and coupled to the high-side switching node 120 through a second resistive element 402, in accordance with an embodiment. As shown in FIG. 4, a first terminal of the second resistive element 402 is coupled to (e.g. to form a node with) the reference terminal of the high-side driver 114-1. In addition, a second terminal of the second resistive element 402 is coupled to (e.g. to form a node with) the high-side switching node 120. This is in addition to the reference terminal of the high-side driver 114-1 being coupled to (e.g. to form a node with) the sixth die pad 100-6. An effect of coupling the second resistive element 402 between the reference terminal of the high-side driver 114-1 and the high-side switching node 120 is the damping of voltage oscillations that may occur between the reference terminal of the high-side driver 114-1 and the high-side switching node 120. The second resistive element 402 also acts to limit a voltage separation between the reference terminal of the high-side driver 114-1 and the high-side switching node 120, thereby further reducing voltage oscillations at the reference terminal of the high-side driver 114-1 and further increasing the speed at which the high-side transistor 116 may be turned on (e.g. compared to the third DC-DC converter 300 in FIG. 3). The circuit topology shown in FIG. 4 can also be used to avoid the use of a large-area high-side driver 114-1 to keep the high-side transistor 116 turned off when the low-side transistor 118 turns on. In fact, by tuning the values of the resistive element 202, the second resistive element 402, and the sixth parasitic inductor 302, the gate voltage of the high-side transistor 116 is less than zero during turn off of the low-side transistor 118, thereby preventing the high-side transistor 116 from being turned on during turn on of the low-side transistor 118.

In some embodiments, the resistive element 202 may have a resistance between about 0.3Ω and about 3Ω, the second resistive element 402 may have a resistance between about 1Ω and about 10Ω, and the sixth parasitic inductor 302 may have an inductance between about 0.5 nH and about 2 nH (e.g. about 1 nH). In some embodiments, the resistance of the second resistive element 402 may be tuned based on an inductance of the sixth parasitic inductor 302.

Figure 5A:
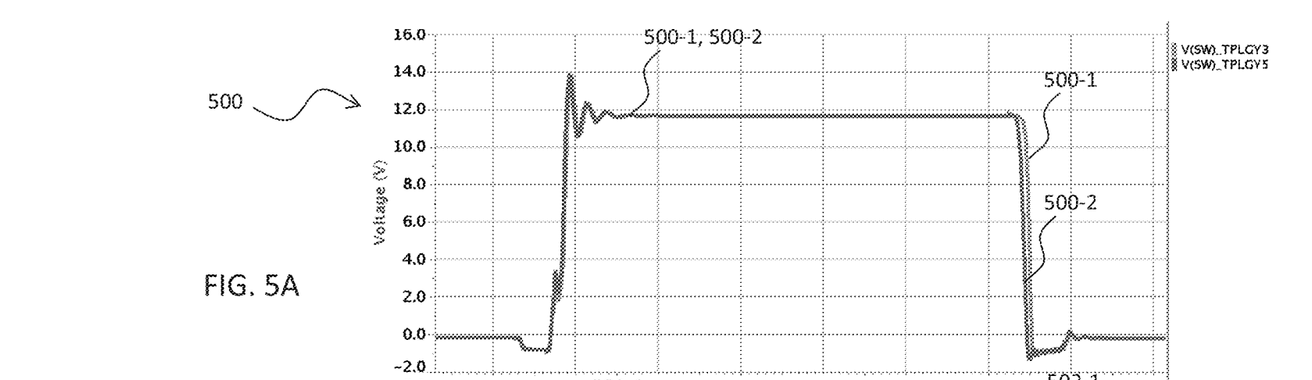
FIG. 5A shows a first plot that illustrates a voltage at a switching pin of the package shown in FIG. 2 and a voltage at a switching pin of the package shown in FIG. 4, in accordance with an embodiment.
Figure 5B:
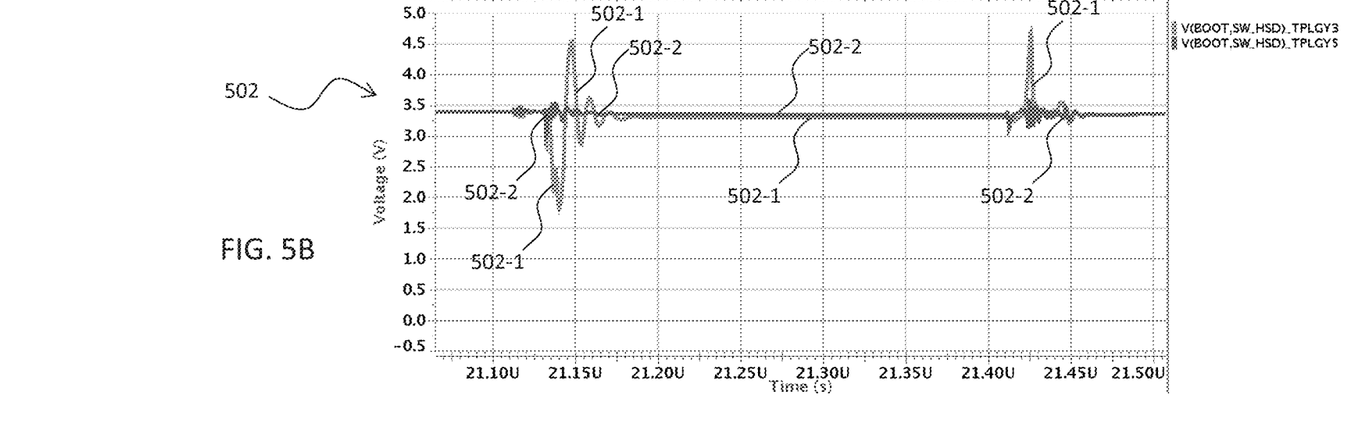
FIG. 5B shows a second plot that illustrates a voltage between a boot pin and a reference terminal of a high-side driver for the circuit diagram shown in FIG. 2 and a voltage between a boot pin and a reference terminal of a high-side driver for the circuit diagram shown in FIG. 4, in accordance with an embodiment.

FIG. 5A shows a first plot 500 that illustrates the voltage 500-1 at the switching pin 101-3 of the package 101 shown in FIG. 2 and the voltage 500-2 at the switching pin 101-3 of the package 101 shown in FIG. 4, in accordance with an embodiment. FIG. 5B shows a second plot 502 that illustrates the voltage 502-1 between the boot pin 101-1 and the reference terminal of the high-side driver 114-1 for the circuit diagram shown in FIG. 2 and the voltage 502-2 between the boot pin 101-1 and the reference terminal of the high-side driver 114-1 for the circuit diagram shown in FIG. 4, in accordance with an embodiment. In the plots shown in FIGS. 5A and 5B, the vertical axes are linear scales denoting voltage (in Volts), while the horizontal axes are linear scales denoting time (in seconds). As shown in FIG. 5A, the voltages at the switching pins 101-3 for both the packages 101 shown in FIGS. 2 and 4 are substantially the same. However, as depicted in FIG. 5B, the voltage between the boot pin 101-1 and the reference terminal of the high-side driver 114-1 for the circuit diagram shown in FIG. 4 has less oscillations than the voltage between the boot pin 101-1 and the reference terminal of the high-side driver 114-1 for the circuit diagram shown in FIG. 2. The differences seen between the voltages 502-1 and 502-2 suggests that the voltage supplied to the high-side driver 114-1 of FIG. 4 is more stable than the voltage supplied to the high-side driver 114-1 of FIG. 2. Due to the increased stability in the voltage supplied to the high-side driver 114-1, the high-side transistor 116 may be turned on at a faster speed in FIG. 4 (e.g. relative to the speeds possible in FIGS. 1 to 3). This in turn may lead to the provision of a DC-DC converter capable of delivering high currents at high switching frequencies with high conversion efficiency, low internal noise, and reduced electromagnetic interference, even when such a DC-DC converter is included in a package where die pads and package pins are coupled to each other by bonding wires.

In summary, voltage oscillations at the power supply, ground, and switching nodes of the package 101 (e.g. caused by parasitic inductors formed by bonding wires) are damped by the decoupling of the reference terminal of the high-side driver 114-1 from the high-side switching node 120 and by its subsequent coupling to a die pad (e.g. the sixth die pad 100-6) of a DC-DC converter. Such voltage oscillations may also be damped by the coupling of the resistive element 202 between the drain terminal of the low-side transistor 118 and the source terminal of the high-side transistor 116. Such voltage oscillations may further be damped by the coupling of the second resistive element 402 between the reference terminal of the high-side driver 114-1 and the high-side switching node 120. The reduction of voltage oscillations at the power supply, ground, and switching nodes of the package 101, in turn, decreases a dead time of the low-side transistor 118, increases switching frequencies, increases conversion efficiency, lowers internal noise, and reduces electromagnetic interference of a DC-DC converter.

In an embodiment, a converter configured to convert a DC input voltage to a DC output voltage, may include: a high-side driver circuit having a first terminal coupled to a first die pad; a high-side transistor having a drain terminal coupled to a second die pad and a source terminal coupled to a third die pad; and a low-side transistor having a source terminal coupled to a fourth die pad and a drain terminal coupled to a fifth die pad. The converter may further include a resistive element coupled between the source terminal of the high-side transistor and the drain terminal of the low-side transistor, where a second terminal of the high-side driver circuit is coupled to a sixth die pad.

In an embodiment, a converter configured to convert a DC input voltage to a DC output voltage, may include: a high-side switching transistor coupled between a voltage input node and a high-side switching node; a low-side switching transistor coupled between a low-side switching node and a ground node; and a first resistive element coupled between the high-side switching node and the low-side switching node. The converter may further include a high-side driver having a first terminal coupled to a boot node and a second terminal coupled to an auxiliary switching node different from the low-side switching node and the high-side switching node, the high-side driver being configured to control an operation of the high-side switching transistor.

In an embodiment, a converter configured to convert a DC input voltage to a DC output voltage, may include: a high-side transistor having a drain terminal and a source terminal respectively coupled to a voltage input pin and a switching pin of a package by a first pair of bonding wires; and a high-side driver having a first terminal and a second terminal respectively coupled to a boot pin and the switching pin of the package by a second pair of bonding wires different from the first pair of bonding wires. The high-side driver may be configured to output a high-side drive signal to a gate terminal of the high-side transistor. The converter may further include a low-side transistor having a drain terminal and a source terminal respectively coupled to the switching pin and a ground pin of the package by a third pair of bonding wires different from the second pair of bonding wires; and a first resistive element coupled between the source terminal of the high-side transistor and the drain terminal of the low-side transistor.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The devices and processing systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a processor, a digital signal processor (DSP), an Application Specific Integrated Circuit (ASIC), a field programmable gate array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A converter configured to convert a DC input voltage to a DC output voltage, the converter comprising:
    a high-side driver circuit having a first terminal coupled to a first die pad;
    a high-side transistor having a drain terminal coupled to a second die pad and a source terminal coupled to a third die pad;
    a low-side transistor having a source terminal coupled to a fourth die pad and a drain terminal coupled to a fifth die pad;
    a resistive element coupled between the source terminal of the high-side transistor and the drain terminal of the low-side transistor, wherein a second terminal of the high-side driver circuit is coupled to a sixth die pad, wherein the third die pad, the fifth die pad, and the sixth die pad are coupled to a switching pin of a package; and
    at least one inductive element, separate from the resistive element, coupled between the third die pad and the fifth die pad, wherein a first electrical path, comprising the resistive element, connects the source terminal of the high-side transistor to the drain terminal of the low-side transistor, wherein a second electrical path, separate from the first electrical path and comprising the at least one inductive element, further connects the source terminal of the high-side transistor to the drain terminal of the low-side transistor, and wherein a third electrical path, separate from the first electrical path and the second electrical path, directly couples the sixth die pad to the switching pin.

2. The converter of claim 1, wherein the first terminal and the second terminal of the high-side driver circuit comprise a power terminal and a reference terminal of the high-side driver circuit.

3. The converter of claim 1, wherein the high-side driver circuit is configured to output a high-side drive signal to a gate terminal of the high-side transistor.

4. The converter of claim 1, wherein the first die pad is configured to be coupled to a boot pin of the package by a bonding wire.

5. The converter of claim 1, wherein the second die pad is configured to be coupled to an input voltage pin of the package by a bonding wire.

6. The converter of claim 1, wherein the third die pad, the fifth die pad, and the sixth die pad are coupled to the switching pin of the package by respective bonding wires.

7. The converter of claim 1, wherein the fourth die pad is configured to be coupled to ground pin of the package by a bonding wire.

8. The converter of claim 1, further comprising a second resistive element coupled between the second terminal of the high-side driver circuit and the source terminal of the high-side transistor.

9. A converter configured to convert a DC input voltage to a DC output voltage, the converter comprising:
    a high-side switching transistor coupled between a voltage input node and a high-side switching node;
    a low-side switching transistor coupled between a low-side switching node and a ground node;
    a first resistive element coupled between the high-side switching node and the low-side switching node;
    a high-side driver having a first terminal coupled to a boot node and a second terminal coupled to an auxiliary switching node different from the low-side switching node and the high-side switching node, the high-side driver being configured to control an operation of the high-side switching transistor, wherein a first electrical path, comprising the first resistive element, directly connects the high-side switching node to the low-side switching node, and wherein a second electrical path, separate from the first electrical path and comprising at least one inductive element, further directly connects the high-side switching node to the low-side switching node; and
    a package comprising:
        a boot pin configured to be coupled to the boot node by a first bonding wire;
        a voltage input pin configured to be coupled to the voltage input node by a second bonding wire;
        a switching pin configured to be directly coupled to the high-side switching node, the auxiliary switching node, and the low-side switching node by a third bonding wire, a fourth bonding wire, and a fifth bonding wire, respectively; and
        a ground pin configured to be coupled to the ground node by a sixth bonding wire.

10. The converter of claim 9, further comprising a low-side driver having a first terminal configured to receive a power supply voltage and a second terminal coupled to the ground node, the low-side driver being configured to control an operation of the low-side switching transistor.

11. The converter of claim 9, further comprising a second resistive element coupled between the second terminal of the high-side driver and the high-side switching node.

12. The converter of claim 11, wherein a resistance of the second resistive element is between about 1 Ohm and about 10 Ohms.

13. The converter of claim 9, wherein an inductance of the fourth bonding wire is between about 0.5 nH and about 2 nH.

14. The converter of claim 9, further comprising a boot capacitor coupled between the boot pin and the switching pin of the package.

15. A converter configured to convert a DC input voltage to a DC output voltage, the converter comprising:
- a high-side transistor having a drain terminal and a source terminal respectively coupled to a voltage input pin and a switching pin of a package by a first pair of bonding wires;
- a high-side driver having a first terminal and a second terminal respectively coupled to a boot pin and the switching pin of the package by a second pair of bonding wires different from the first pair of bonding wires, the high-side driver being configured to output a high-side drive signal to a gate terminal of the high-side transistor;
- a low-side transistor having a drain terminal and a source terminal respectively coupled to the switching pin and a ground pin of the package by a third pair of bonding wires different from the second pair of bonding wires;
- a first resistor coupled between the source terminal of the high-side transistor and the drain terminal of the low-side transistor;
- a boot capacitor having a first terminal coupled to the switching pin of the package and a second terminal coupled to the boot pin of the package; and
- an output inductor having a first terminal directly coupled without any intervening resistor to the switching pin of the package and directly coupled without any intervening resistor to the first terminal of the boot capacitor, wherein the DC output voltage is produced at a second pin of the output inductor.

16. The converter of claim 15, further comprising a second resistor coupled between the second terminal of the high-side driver and the source terminal of the high-side transistor.

17. The converter of claim 15, further comprising a low-side driver having a first terminal configured to receive an internal power signal and a second terminal coupled to the source terminal of the low-side transistor, the low-side driver being configured to output a low-side drive signal to a gate terminal of the low-side transistor.

18. The converter of claim 17, further comprising a control logic circuit configured to provide the internal power signal and control signals to each of the high-side driver and the low-side driver.

\* \* \* \* \*